United States Patent [19]

Yokoshima et al.

[11] Patent Number: 4,540,809

[45] Date of Patent: Sep. 10, 1985

[54] (METH) ACRYLATE ESTERS OF DIPENTAERYTHRITOL CAPROLACTONE CONDENSATES

[75] Inventors: Minoru Yokoshima, Yamaguchi; Kazuyoshi Nawata, Onoda; Tetsuo Ohkubo, Ube; Hideaki Hattori, Yamaguchi, all of Japan

[73] Assignee: Nippon Kayaku Kabushiki Kaisha, Tokyo, Japan

[21] Appl. No.: 507,537

[22] Filed: Jun. 24, 1983

[30] Foreign Application Priority Data

Jun. 25, 1982 [JP] Japan .................. 57-108528

[51] Int. Cl.³ ............... C07C 69/675; C07C 69/73
[52] U.S. Cl. ................... 560/185; 526/320; 204/159.22
[58] Field of Search .............. 560/185; 526/323.1, 526/323.2

[56] References Cited

U.S. PATENT DOCUMENTS 4,409,376 10/1983 Dowbenko et al. ............ 526/323.2
4,452,996 6/1984 Yokoshima et al. ............ 560/185

FOREIGN PATENT DOCUMENTS 185236 11/1982 Japan .................. 560/224

Primary Examiner—Natalie Trousof
Assistant Examiner—L. Hendriksen
Attorney, Agent, or Firm—Oblon, Fisher, Spivak, Mcclelland & Maier

[57] ABSTRACT

Disclosed herein are ethylenically unsaturated compounds represented by the formula:

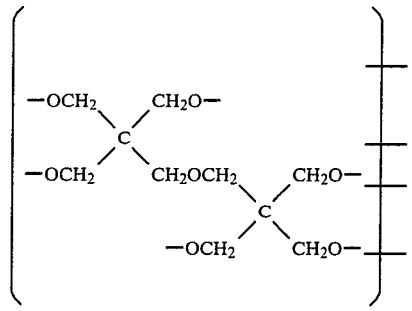

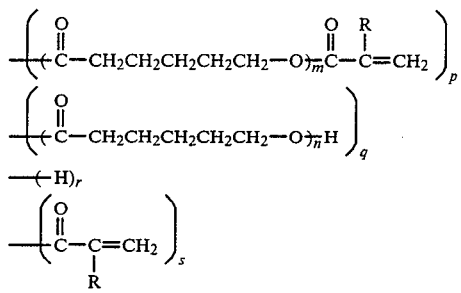

wherein R represents a hydrogen atom or a methyl group, on the average m and n respectively represent a value of 1 to 5, on the average p represents a value of 1 to 6, on the average q and r represent respectively a value of 0 to 3, on the average s represents a value of 0 to 5, p+q+r+s is 6: q+r is a value of 0 to 3, p+s is a value of 3 to 6 and the average value of mp+nq is 1 to 30, and a method for producing the same.

6 Claims, No Drawings

(METH) ACRYLATE ESTERS OF DIPENTAERYTHRITOL CAPROLACTONE CONDENSATES

BACKGROUND FIELD

The present invention relates to novel ethylenically unsaturated compounds which polymerize easily in the presence of heat, ultraviolet rays, ionizing radiations and a radical initiator, and a method for producing thereof.

DESCRIPTION OF PRIOR ART

Recently, paints and printing inks hardenable by ultraviolet rays have been generalized. As the reactive monomer of such paints and printings, acrylic monomers are in use, and particularly, as the monomers giving a hard painted membrane and having a high speed of polymerization, dipentaerythritol hexaacrylate and dipentaerythritol pentaccrylate have been generally known, and the amount thereof used for producing such paints and printing inks have been increased.

However, in the case of using dipentaerythritol heax- (or penta) acrylate as the reactive monomer for producing an abrasion-resistant paint, there is a demerit. The ester cannot be easily used for producing a sheet-like base material because of the lack of flexibility of the hardened membrane obtained therefrom.

As a result of the present inventors' studies, a group of novel, ethylenically unsaturated compounds which give a hardened membrane of excellent plasticity and abrasion-resistance after polymerizing has been obtained.

SUMMARY

Namely, the present invention relates to a group of novel, ethylenically unsaturated compounds represented by the formula:

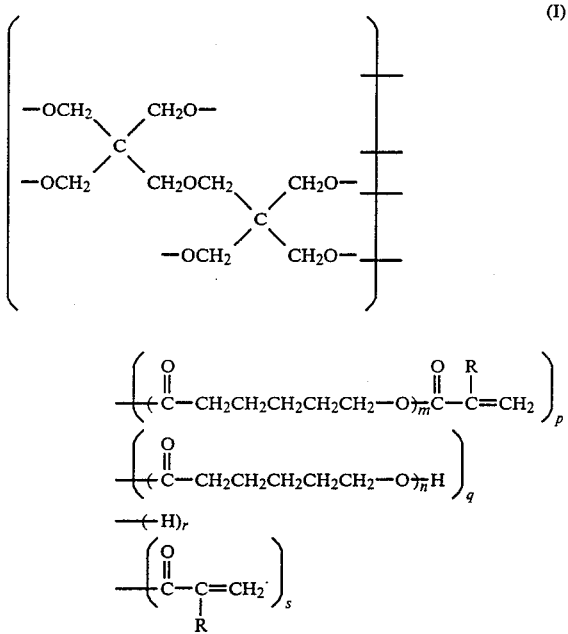

wherein R represents a hydrogen atom or a methly group: on average m and n respectively represent a value of 1 to 5: on average p represents value of 1 to 6: on average q and r represent respectively a value of 0 to 3, preferably 0 1: on average s represents a value of 0 to 5: p+q+r+s is 6: q+r is a value of 0 to 3, preferably 0 1: p+s is a value of 3 to 6, preferably 5 to 6 and the average value of mp + nq is 1 to 30, preferably 1 to 12. Particularly preferred are compounds having an average value of mp+ng of 2-3, 6 or 12.

The novel, ethylenically unsaturated compounds represented by the general formula (I) are produced by esterifying with acrylic acid or methacrylic acid the condensate of ε-caprolactone with a dipentaerythritol represented by the formula (II):

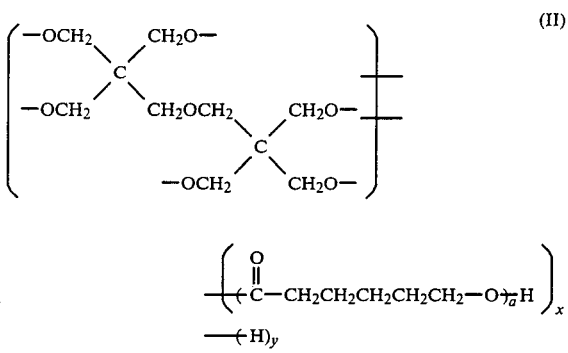

wherein on average a represents a value of 1 to 5: on average x represents a value of 1 to 6: on average y represents a value of 0 to 5: x+y is 6 and the average value of ax is 1 to 30, with acrylic acid or methacrylic acid. The esterification will be more precisely discussed later. In addition, the condensate (II) of dipentaerythritol and ε-caprolactone is produced by the reaction of dipentaerythritol and ε-caprolactone.

DESCRIPTION OF THE PREFERRED EMBODIMENTS

Preparation of a condensate represented by the general formula (II)

It is preferable to use a catalytically effective amount of a catalyst in the reaction of dipentaerythritol and ε-caprolactone, and the amount is 0.001 to 1.0% by weight of the amount of ε-caprolactone, preferably 0.01 to 0.2% by weight. The catalyst effective in the reaction has been known by the persons skilled in the field of chemistry of lactone additives. As an instance of the effective catalysts, organic titanium compounds such as tetraisopropyl titanate, tetrabutyl titanate, etc., organic tin compounds such as tetraphenyltin, tetraoctyltin, diphenyltin dilaurate, dilauryltin oxide, di-n-butyltin dichloride, etc. may be mentioned.

The reaction of dipentaerythritol and ε- caprolactone is carried out at 50° to 300° C., preferably 130° to 200° C. for a time sufficient for completing the reaction between the reactants.

The amount of ε-caprolactone charged for the reaction is about 1 to 30 mols or more, preferably 1 to 12 mols per one mol of the charged amount of dipentaerythritol. In order to minimize the oxidative side reaction, it is preferable to carry out the reaction in an inert gaseous atmospher. After completing the reaction, the reaction product comprising the condensate and the starting substances can be used as it is.

Production of the ethylenically unsaturated compound represented by the general formula (I)

As mentioned above, the ethylenically unsaturated compound represented by the formula (I) is produced by the reaction of the condensate represented by the formula (II) and acrylic acid or methacrylic acid, or a mixture thereof. The amount of acrylic acid or methacrylic acid used in the reaction is about 6 to 12 mols per one mol of the condensate represented by the formula (II). Although it is favorable to bring the storichiometric amount of the acid, i.e., 6 mols into reaction with the reactive hydrogen atoms of the hydroxl groups of the condensate(II), it is practically preferable to charge a little excessive amount of the acid in order to completely carry out the reaction.

Furthermore, in order to minimize or retard the polymerization of the acrylic double bonds of the acid, it is preferable to bring the acid into contact with a polymerization-inhibitor which has been well known by the persons skilled in the art, the amount of the polymerization-inhibitor is used in a concentration of 0.01 to 5% by weight based on the mixture. the acids. As an instance of the polymerization-inhibitor, hydroquinone, p-methoxyphenol, 2,4-dimethyl-6-t-butylphenol, 3-hydroxythiol, alpha-nitroso-beta-naphthol, p-benzoquinone, 2,5-dihydroxy-p-quinone, phonothiazine, N-nitrosodiphenylamine and copper salts may be mentioned.

The reaction of producing the ethylenically unsaturated compound represented by the formula(I) may be generally carried out at about 50° to 130° C., preferably at 65° to 90° C. for a time period sufficient for completing the esterification of the condensate represented by the formula(II) with acrylic acid or methacrylic acid.

The time period of reaction depends on the scale of reaction-batch, the respective reactants, the catalyst and the reaction conditions adopted. In the reaction mixture, an esterifying catalyst is added at an amount of 0.1 to 15% by mol, preferably 1 to 6% by mol of acrylic acid of methacrylic acid. As an esterifying catalyst, any known esterifying catalyst may be used, for instance, p-toluensesulfonic acid, methanesulfonic acid, phosphoric acid, sulfuric acid, etc. In addition, it is desirable to carry out the reaction in the presence of an inert solvent such as hexane, cyclohexane, benzene and toluene to assist the removal of water formed in the esterification.

The thus produced ethylenically unsaturated compound represented by the formula(I) is useful as a vehicle for paints and compositions for inks, and can be hardened by ionizing radiation or thermal means.

Hardening by ionizing radiation can be carried out by using elementary particles such as an electron beam or chemical rays such as ultraviolet rays. In the case of hardening by a chemical ray, a photosensitizer of the known type of a photo-polymerization initiator is used in the reaction system. The technique of hardening by ionizing radiation and the thermal hardening are well known by the persons skilled in the art, and the hardening according to the present invention can be carried out by one of the respective techniques.

The ethylenically unsaturated compound represented by the formula(I) can be used as it is solely, or can be used after admixing with another monomer or polymer.

Furthermore, the compound represented by the formula(I) may be polymerized by the addition of an organic peroxide.

In a representative mode of execution, acrylic acid, a condensate represented by the formula(II), a catalyst, a solvent and a polymerization-inhibitor are charged into a reaction vessel. The thus charged mixture is heated until esterification is completed substantially, and then according to the conventional method, the thus formed ethylenically unsaturated compound is recovered from the reaction mixture.

The present invention will be explained further more in detail by the following synthetic examples of the condensate from dipentaerythritol and $\epsilon$-caprolactone, and the examples. In the following, part means part by weight unless otherwise indicated.

SYNTHETIC EXAMPLE 1

Synthesis of a condensate from dipentaerythritol and $\epsilon$-caprolactone:

Into a 2-liter-reactor provided with a stirrer, a thermocontroller, a thermometer and a condenser, 508 parts of dipentaerythritol, 456 parts of $\epsilon$-caprolactone and 0.28 part of isopropyl titanate were charged, and the content of the reactor was heated to 160° to 170° C. under a nitrogen atmosphere until the amount of unreacted $\epsilon$-caprolactone became less than 1%. The thus obtained condensate was a waxy substance showing a hydroxyl group-value of 691 and an acid value of 2.0. As a result of measuring the molecular weight thereof, the condensate of dipentaerythritol and $\epsilon$-caprolactone had about 2 $\epsilon$-caprolactone units in the molecule on the average. Hereinafter the thus obtained condensate is referred to as the condensate of dipentaerythritol and $\epsilon$-caprolactone (2M).

SYNTHETIC EXAMPLE 2

Synthesis of another condensate from dipentaerythritol and $\epsilon$-caprolactone Into the same reactor used in Synthetic Example 1, 508 parts of dipentaerythritol, 684 parts of $\epsilon$-caprolactone and 0.42 part of isopropyl titanate were charged, and the content was brought into reaction as in Synthetic Example 1 until the remaining amount of $\epsilon$-caprolactone became less than 1%. The thus obtained condensate was a waxy substance showing a hydroxyl group-value of 559 and an acid value of 1.7. As a result of determining molecular weight thereof, it was found that the condensate has about 3 $\epsilon$-caprolactone units in the molecule on the average. Hereinafter, the thus obtained condensate in Synthetic Example 2 is referred to as the condensate of dipentaerythritol and $\epsilon$-caprolactone (3M).

EXAMPLE 1

Synthesis of one of the ethylenically unsaturated compounds according to the present invention Into a 2-liter-reactor provided with a stirrer, a temperature controller, a thermometer, a condenser and a separator, 300 parts of the condensate of dipentaerythritol and $\epsilon$-caprolactone(2M) obtained in Synthetic Example 1, 296.0 parts of acrylic acid, 41.1 parts of p-toluenesulfonic acid, 720 parts of benzene, 180 parts of cyclohexane and 3 parts of hydroquinone were charged, and the content of the reactor was brought into reaction by heating the reactants to 77° to 81° C. while distilling the water formed by the reaction, condensing thereof with the solvent and removing only the water from reaction system, the recovered solvent being returned to the reactor. At the time when the amount of the water became 67.2 parts, the reaction system was cooled to stop the reaction, and the reaction mixture was dissolved into a mixture of 720 parts of benzene and 180 parts of cyclohexane, and after neutralizing the acidity of the solution with an aqueous 20% solution of sodium hydroxide, the neutralized solution was washed three times with each 500 parts of an aqueous 20% solution of sodium chloride. By distilling the solvent off from the washed solution under a reduced pressure, 401 parts of a pale yellow, viscous liquid was obtained. The liquid had the following properties:

Specific gravity at 25° C.: 1.1600
Viscosity at 25° C.: 1914 cps
Acid value: 0.06 mg KOH/g
Refractive index at 20° C.: 1.4842
Elementary analytical data: found C: 59.55% and H: 7.07%

Nuclear magnetic resonance spectrum of the liquid determined by an NMR spectrograph of high resolution was as follows:

| Number of absorption peak | Position of the peak (Frequency in Hz) |
|---|---|
| No. 1 | 2607.421 |
| 2 | 2597.656 |
| 3 | 2498.046 |
| 4 | 2486.328 |
| 5 | 1974.609 |
| 6 | 1962.890 |
| 7 | 1931.640 |
| 8 | 1921.875 |
| 9 | 1193.359 |
| 10 | 1160.156 |
| 11 | 1128.906 |
| 12 | 1052.734 |
| 13 | 964.843 |
| 14 | 943.359 |
| 15 | 646.484 |
| 16 | 511.718 |
| 17 | 507.812 |
| 18 | 425.781 |
| 19 | 382.812 |
| 20 | 367.187 |

In the above-mentioned determination, tetramethylsilane was used as a standard substance and chloroform was used as a solvent, and the result of $^1H$, $^{13}C$—H coupling was determined to obtain finally the identified result of $^{13}C$—D couple which was shown above. Of the absorption spectral peaks, those of No. 9, 10 and 11 were the position of absorption by the solvent.

EXAMPLE 2

Synthesis of one of the ethylenically unsaturated compounds according to the present invention Into the same reactor used in Example 1, 300 parts of the condensate of dipentaerythritol and ε-caprolactone(3M) obtained in Synthetic Example 2, 261 parts of acrylic acid, 36.3 parts of p-toluenesulfonic acid, 480 parts of benzene, 120 parts of cyclohexane and 3 parts of hydroquinone were charged, and the charged mixture was heated to a reaction temperature of 78° to 82° C. until the distilled and recovered water formed by the reaction amounted to 54.3 parts. Then the reaction mixture was dissolved in a mixture of 640 parts of benzene and 160 parts of cyclohexane, and after neutralizing the acidity of the solution with an aqueous 20% solution of sodium hydroxide, the neutralized solution was washed three times with each 500 parts of an aqueous 20% solution of sodium chloride. By distilling the solvent off from the washed solution, 393 parts of a pale yellow, viscous liquid was obtained. The thus obtained liquid has the following properties:

Specific gravity at 25° C.: 1.1490
Viscosity at 25° C.: 1440 cps
Acid value: 0.03 mg KOH/g
Refractive index at 20° C.: 1.4838
Elementary analytical data: found C: 59.91% and H: 7.09%

Absorption peak in nuclear magnetic resonance spectrum:

| Number of peak | Frequency (Hz) | Number of peak | Frequency (Hz) |
|---|---|---|---|
| No. 1 | 2607.421 | No. 13 | 1052.734 |
| 2 | 2597.656 | 14 | 964.843 |
| 3 | 2498.046 | 15 | 943.359 |
| 4 | 2494.140 | 16 | 900.390 |
| 5 | 2486.328 | 17 | 669.921 |
| 6 | 1976.562 | 18 | 646.484 |
| 7 | 1962.890 | 19 | 509.765 |
| 8 | 1931.640 | 20 | 425.781 |
| 9 | 1921.875 | 21 | 382.812 |
| 10 | 1193.359 | 22 | 367.187 |
| 11 | 1160.156 | 23 | 0.000 |
| 12 | 1128.906 | | |

Of the absorption peaks, those of Nos. 10, 11 and 12 are the positions of absorption peaks due to the solvent, and that of No. 23 is the position of absorption peak due to tetramethylsilane.

EXAMPLE 3

Synthesis of one of the ethylenically unsaturated compounds according to the present invention According to the synthetic procedures shown in Synthetic Examples 1 and 2, a condensate of dipentaerythritol and ε-caprolactone having about 6 ε-caprolactone units in the molecule on the average, hereinafter referred to as the condensate of dipentaerythritol and ε-caprolactone(6M) was synthesized.

Into the same reactor used in Example 1, 450 parts of the condensate of dipentaerythritol and ε-caprolactone(6M), 248.9 parts of acrylic acid, 23.3 parts of p-toluenesulfonic acid, 480 parts of benzene, 120 parts of cyclohexane and 3 parts of hydroquinone were charged, and the charged mixture was brought into reaction by heating the mixture to 78° to 82° C. until the amount of formed, distilled and recovered water became 51.8 parts.

After dissolving the reaction product into a mixture of 960 parts of benzene and 240 parts of cyclohexane and neutralizing the thus obtained solution with an aqueous 20% solution of sodium hydroxide, the neutralized solution was washed three times with each 500 parts of an aqueous 20% solution of sodium chloride. By distilling the solvent off from the washed solution under a reduced pressure, 487 parts of a pale yellow, viscous liquid was obtained as the final product. The product had the following properties:

Specific gravity at 25° C.: 1.1335
Viscosity at 25° C.: 610.3 cps
Acid value: 0.02 mg KOH/g
Refractive index at 20° C: 1.4810
Elementary analytical data: found C: 61.20% and H: 7.54%

Absorption peaks in NMR spectrum:

| Number of absorption peak (hereinafter referred to Absorption peak number) | Position of the peak (Hz) (hereinafter referred to as Frequency) | Number of absorption peak | Position of the peak (Hz) |
| --- | --- | --- | --- |
| No. 1 | 2605.468 | No. 12 | 1052.734 |
| 2 | 2595.703 | 13 | 960.937 |
| 3 | 2496.093 | 14 | 939.453 |
| 4 | 2486.328 | 15 | 666.015 |
| 5 | 1974.609 | 16 | 644.531 |
| 6 | 1960.937 | 17 | 509.765 |
| 7 | 1929.687 | 18 | 423.828 |
| 8 | 1919.921 | 19 | 380.859 |
| 9 | 1191.406 | 20 | 365.234 |
| 10 | 1160.156 | 21 | 11.718 |
| 11 | 1126.953 | 22 | −1.953 |

Of the above-shown peaks, those of Nos. 9, 10 and 11 are due to the solvent and that of No. 22 is due to tetramethylsilane.

EXAMPLE 4

Synthesis of one of the ethylenically unsaturated compounds according to the present invention Into the same reactor used in Example 1, 500 parts of the condensate of dipentaerythritol and ε-caprolactone(6M) prepared in Example 3, 302 parts of methacrylic acid, 25.8 parts of p-toluenesulfonic acid, 600 parts of toluene and 4 parts of hydroquinone were charged, and the charged mixture was brought into reaction by heating thereof to 110° to 119° C. until the amount of the formed, distilled and recovered water became 57.5 parts. After dissolving the reaction mixture into 1000 parts of toluene and neutralizing the acidity of the solution with an aqueous 20% solution of sodium hydroxide, the neutralized solution was washed three times with each 600 parts of an aqueous 20% solution of sodium chloride. By distilling the solvent off from the washed solution under a reduced pressure, 590 parts of a pale yellow, viscous liquid was obtained. The thus obtained liquid had the following properties:

Specific gravity at 25° C.: 1.1140
Viscosity at 25° C.: 1276 cps
Acid value: 0.02 mg KOH/g
Refractive index at 20° C.: 1.4815
Elementary analytical data: found C: 62.34% and H: 7.92%
Absorption peaks in NMR spectrum:

| Absorption peak number | Frequency (Hz) | Absorption peak number | Frequency (Hz) |
| --- | --- | --- | --- |
| No. 1 | 2605.468 | No. 14 | 1126.953 |
| 2 | 2601.562 | 15 | 1052.734 |
| 3 | 2595.703 | 16 | 964.843 |
| 4 | 2513.671 | 17 | 960.937 |
| 5 | 2507.812 | 18 | 941.406 |
| 6 | 2501.953 | 19 | 667.968 |
| 7 | 2048.828 | 20 | 644.531 |
| 8 | 2039.062 | 21 | 509.765 |
| 9 | 1951.171 | 22 | 505.859 |
| 10 | 1892.578 | 23 | 423.828 |
| 11 | 1880.859 | 24 | 380.859 |
| 12 | 1191.406 | 25 | 367.187 |
| 13 | 1160.156 | 26 | 271.484 |
| | | 27 | 11.718 |

Of the above-shown peaks, those of Nos. 12, 13 and 14 are due to the solvent.

EXAMPLE 5

Synthesis of one of the ethylenically unsaturated compounds according to the present invention Into the same reactor used in Synthetic Example 1, 254 parts of dipentaerythritol, 1368 parts of ε-caprolactone and 0.82 part of isopropyl titanate were charged, and the charged mixture was brought into reaction by heating the mixture to 160 to 170° C. in an nitrogen atmosphere until the amount of unreacted ε-caprolactone became less than 1%. The thus obtained condensate of dipentaerythritol an ε-caprolactone had about 12 ε-caprolactone units in the molecule on the average and was a pale yellow, viscous liquid showing a hydroxyl group-value of 209 and an acid value of 2.7.

Into the same reactor used in Example 1, 800 parts of the thus obtained condensate, 256 parts of acrylic acid, 23.8 parts of p-toluenesulfonic acid, 480 parts of benzene, 120 parts of cyclohexane and 4 parts of hydroquinone, and the mixture was brought into reaction by heating the mixture to 84° to 87° C. until the amount of the formed, distilled and recovered water became 53.2 parts.

After dissolving the reaction mixture into a mixture of 1824 parts of benzene and 456 parts of cyclohexane, neutralizing the acidity of the solution with an aqueous 20% solution of sodium hydroxide and washing the neutralized solution three times with each 400 parts of an aqueous 20% solution of sodium hydroxide, the solvent was removed from the solution by distillation under a reduced pressure to obtain a pale yellow viscous liquid in an amount of 754 parts. The thus obtained product had the following properties:

Specific gravity at 25° C.: 1.1180
Viscosity at 25° C.: 2242 cps
Acid value: 0.02 mg KOH/g
Refractive index at 20° C.: 1.4780
Elementary analytical data: found C: 61.91% and H: 8.01%
Absorption peaks in NMR spectrum:

| Absorption peak No. | Frequency (Hz) | Absorption peak No. | Frequency (Hz) |
| --- | --- | --- | --- |
| No. 1 | 2621.093 | No. 13 | 1126.953 |
| 2 | 2605.468 | 14 | 1052.734 |
| 3 | 2601.562 | 15 | 960.937 |
| 4 | 2597.656 | 16 | 939.453 |
| 5 | 2496.093 | 17 | 921.875 |
| 6 | 2486.328 | 18 | 644.531 |
| 7 | 1972.656 | 19 | 509.765 |
| 8 | 1960.937 | 20 | 482.421 |
| 9 | 1929.687 | 21 | 423.828 |
| 10 | 1919.921 | 22 | 380.859 |
| 11 | 1191.406 | 23 | 367.187 |
| 12 | 1160.156 | 24 | −29.296 |

Of the above- shown peaks, those of Nos. 11, 12 and 13 are due to the absorption by the solvent.

The data shown in Table 1 below are those concerning the mechanical properties of the specimens made of the ethylenically unsaturated compounds produced by the methods shown in Examples as compared to those of the specimen made of dipentaerythritol hexaacrylate (manufactured by Nippon Kayaku Co., Ltd. under the registered trade name of DPHA) determined by the following test methods:

Test methods (1) Abrasion resistance:

After dissolving each 100 parts of the novel, ethylenically unsaturated compounds produced in Examples 1 to 5 and DPHA in 100 parts of toluene, 3% by weight of Vaicure-55 ® (Stauffer Co.) was added to each solution as a sensitizer to prepare each hardening liquid.

A plate made of a hard polyvinyl chloride resin of 2 mm in thickness was soaked into the thus prepared hardening liquid, and then, the plate was slowly pulled up from the liquid to form the membranes on the surfaces of the plate. After leaving the coated plate as it is for 10 min at 50° C., each plate was irradiated by ultraviolet rays from the two high-pressure mercury lamps (made by Toshiba Co., Ltd., 2 kw) at a distance of 8 cm onto the both surfaces thereof to harden the membranes on each plate. Thereafter, the coated plate was subjected to the following tests:

(a) Surface hardness: Hardness test following the standard method of Japanese Industrial Standards(JIS) K-5651/1966 using pencils of hardness of H to 9H.

(b) Abrasion resistance: Abrasion test by rubbing with a steel wool of a grade #-000, the criterion being as follows:

| Criterion | Test result |
| --- | --- |
| A | the surface scarcely disfigured by light rubbing with the steel wool. |
| B | the surface disfigured a little by light rubbing with the steel wool. |
| C | the surface severely disfigured by light rubbing with the steel wool. |

(2) Bending strength:

By adding 6% by weight of Irugacure-184 ® (manufacture by Ciba-Geigy Co., Ltd.) to each of the novel ethylenically unsaturated compounds produced in Examples 1 to 5 and DPHA to prepare each hardening liquid. After coating one of the surfaces of a sheet made of a polyvinyl chloride resin with each hardening liquid to the thickness of 25 micrometers while using a roll-coater, the coated sheet was irradiated by ultraviolet rays from the same mercury lamp as in the abrasion test to harden the membrane of the coating. From the coated sheet with the hardened surface membrane, test pieces of 10 mm in width and 6 cm in length were cut out. The test piece was subjected to bending around a series of cylindrical tubes of the respective diameters of 10, 8, 6, 4, 3 and 2 mm placed in the middle part of the test piece while bringing the not-coated surface into contact with the tube in order to see the occurrence of surface cracking due to the bending. The diameter of the tube around which the crack occurred on the coated and hardened membrane was recorded, the membrane being the better as the diameter of the tube was smaller.

TABLE 1

Test results of Mechanical properties

| Run No. | Ethylenically unsaturated compound | Time period of UV irradiation (sec) | Surface Hardness | Abrasion Test | Bending strength |
| --- | --- | --- | --- | --- | --- |
| 1 | Dipentaerythritol hexaacrylate | 10 | 8H | A | >10 mm |
| 2 | The compound obtained in Example 1 | 10 | 7H | A | 6 mm |
| 3 | The compound obtained in Example 2 | 10 | 7H | A | 4 mm |
| 4 | The compound obtained in Example 3 | 10 | 6H | A | <2 mm |
| 5 | The compound obtained in Example 4 | 30 | 2H | B | <2 mm |
| 6 | The compound obtained in Example 5 | 10 | 2H | B | <2 mm |

Note:
Though the ethylenically unsaturated compounds obtained in Examples 4 and 5 have a value of 2H in surface hardness test and a rating of B in abrasion test, these ethylenically unsaturated compounds are possibly put to practical use because these compounds have a value of less than 2 mm in bending strength test.

What is claimed is:

1. An ethylenically unsaturated compound of the formula

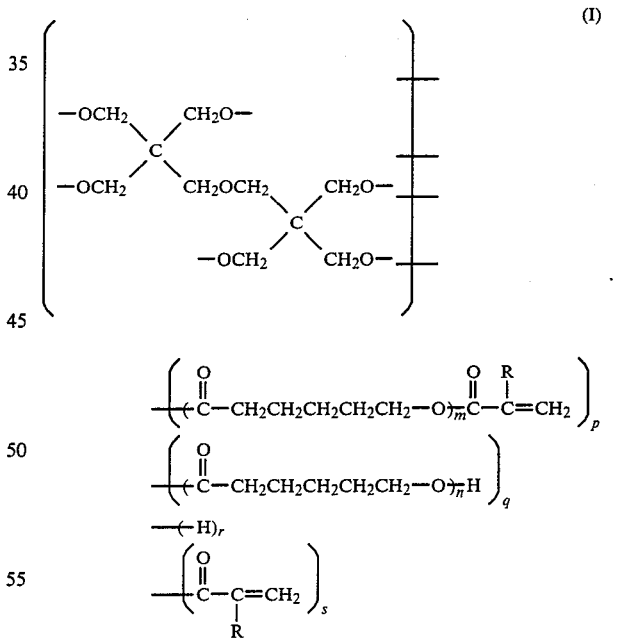

wherein:
R is hydrogen or methyl;
on the average m and n respectively are 1 to 5;
on average p is 1 to 6;
on the average q and r are 0 to 3;
on the average s is 0 to 5;
p+q+r+s is 6;
q+r is 0 to 3;
p+s is 3 to 6; and
the average value of mp +nq is 1 to 30.

2. The ethylenically unsaturated compound of claim 1, wherein R is hydrogen.

3. The ethylenically unsaturated compound of claim 1, wherein the average value of mp +nq is about 2.

4. The ethylenically unsaturated compound of claim 1, wherein the average value of mp+nq is about 3.

5. The ethylenically unsaturated compound of claim 1, wherein the average value of mp+nq is about 6.

6. The ethylenically unsaturated compound of claim 1, wherein the average value of mp+nq is about 12.

* * * * *